US008464088B1

(12) United States Patent
Nguyen et al.

(10) Patent No.: US 8,464,088 B1
(45) Date of Patent: Jun. 11, 2013

(54) MULTIPLE CHANNEL BONDING IN A HIGH SPEED CLOCK NETWORK

(75) Inventors: Toan Thanh Nguyen, San Jose, CA (US); Sergey Shumarayev, Los Altos Hills, CA (US); Tim Tri Hoang, San Jose, CA (US); Weiqi Ding, Fremont, CA (US); Thungoc M. Tran, San Jose, CA (US)

(73) Assignee: Altera Corporation, San Jose, CA (US)

( * ) Notice: Subject to any disclaimer, the term of this patent is extended or adjusted under 35 U.S.C. 154(b) by 286 days.

(21) Appl. No.: 12/915,794

(22) Filed: Oct. 29, 2010

(51) Int. Cl.
*G06F 1/04* (2006.01)
(52) U.S. Cl.
CPC ........................................ *G06F 1/04* (2013.01)
USPC .......................................................... 713/500
(58) Field of Classification Search
USPC .......................................................... 713/500
See application file for complete search history.

(56) References Cited

U.S. PATENT DOCUMENTS

| | | | | |
|---|---|---|---|---|
| 6,888,376 | B1* | 5/2005 | Venkata et al. | 326/41 |
| 7,162,553 | B1* | 1/2007 | Xue et al. | 710/71 |
| 7,180,972 | B1* | 2/2007 | Venkata et al. | 375/371 |
| 7,276,936 | B1* | 10/2007 | Hoang et al. | 326/41 |
| 7,276,937 | B2* | 10/2007 | Hoang et al. | 326/41 |
| 7,403,035 | B1* | 7/2008 | Shumarayev et al. | 326/41 |
| 7,576,563 | B1* | 8/2009 | Wei et al. | 326/41 |
| 7,602,212 | B1* | 10/2009 | Chan et al. | 326/37 |
| 7,616,657 | B2* | 11/2009 | Shumarayev et al. | 370/464 |
| 7,656,187 | B2* | 2/2010 | Tran et al. | 326/38 |
| 7,698,482 | B2* | 4/2010 | Venkata et al. | 710/60 |
| 8,228,102 | B1* | 7/2012 | Pham et al. | 327/156 |
| 2006/0233172 | A1* | 10/2006 | Venkata et al. | 370/391 |
| 2007/0011370 | A1* | 1/2007 | Venkata et al. | 710/62 |
| 2007/0018863 | A1* | 1/2007 | Hoang et al. | 341/100 |
| 2007/0237186 | A1* | 10/2007 | Shumarayev et al. | 370/535 |
| 2010/0058099 | A1* | 3/2010 | Shumarayev et al. | 713/400 |
| 2011/0285434 | A1* | 11/2011 | Shumarayev et al. | 327/156 |
| 2012/0027026 | A1* | 2/2012 | Duwel et al. | 370/465 |

OTHER PUBLICATIONS

"Chapter 2: Stratix IV Transceiver Clocking," Stratix Device Handbook, Jun. 2009, pp. 2-78, 2-79, vol. 2, Altera Corporation, San Jose, CA.

* cited by examiner

*Primary Examiner* — Ryan Stiglic
(74) *Attorney, Agent, or Firm* — Mauriel Kapouytian & Treffert LLP; Michael Mauriel

(57) ABSTRACT

Various methods and structures related to clock distribution for flexible channel bonding are disclosed. One embodiment provides a clock network in physical media attachment ("PMA") circuitry, a specific type or portion of system interconnect circuitry, arranged in pairs of channel groups. In one embodiment, clock generation circuitry blocks ("CGBs") in each pair of channel groups receives outputs of multiple phased locked loop circuits ("PLLs") which can be selectively utilized by the CGBs to generate PMA clock signals. In another embodiment, the CGBs can also select output of a clock data recovery ("CDR")/transmit PLL circuitry block in one of the channels of a channel group of the pair of channel groups. In one embodiment, first groups of connection lines couple circuitry in a channel group pair such that a designated CGB in each channel group pair can provide clock signals to one or more of the channels in the channel group pair. In one embodiment, second groups of connection lines connect channels in one channel group pair to channels in other channel group pairs such that one or more channels across the channel group pairs can receive a clock signal generated by a CGB in a designated channel. These and other embodiments are described more fully in the disclosure.

24 Claims, 4 Drawing Sheets

MULTIPLE CHANNEL BONDING IN A HIGH SPEED CLOCK NETWORK

BACKGROUND

This invention relates generally to the area of system interconnect technology. As integrated circuit (IC) devices increasingly need to support high speed serial interface ("HSSI") protocols, there is an increasing need to bundle data channels in system interconnect circuitry such as physical media attachment ("PMA") circuitry. Successfully bundling (also called "bonding") these channels requires distributing clock signals across multiple channels.

SUMMARY

As HSSI protocols evolve, there is an increasing need to be able to bond an arbitrarily large number of data channels. A scalable solution that allows for clock distribution to support flexible bonding for any number of channels is needed. An embodiment of the present invention provides a clock network in system interconnect circuitry arranged in pairs of channel groups. In one embodiment, clock generation circuitry blocks ("CGBs") in each pair of channel groups receives outputs of multiple phased locked loop circuits ("PLLs") which can be selectively utilized by the CGBs to generate system interconnect clock signals. In another embodiment, the CGBs can also select output of a clock data recovery ("CDR")/transmit PLL circuitry block in one of the channels of a channel group of the pair of channel groups. In one embodiment, first groups of connection lines couple channel circuitry in a channel group pair such that a designated CGB in each channel group pair can provide clock signals to one or more of the channels in the channel group pair. In one embodiment, second groups of connection lines connect channels in one channel group pair to channels in other channel group pairs such that one or more channels across the channel group pairs can receive a clock signal generated by a CGB in a designated channel. These and other embodiments are described more fully below.

BRIEF DESCRIPTION OF THE DRAWINGS

For purposes of illustration only, several aspects of particular embodiments of the invention are described by reference to the following figures.

DETAILED DESCRIPTION

The following description is presented to enable any person skilled in the art to make and use the invention, and is provided in the context of particular applications and their requirements. Various modifications to the exemplary embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
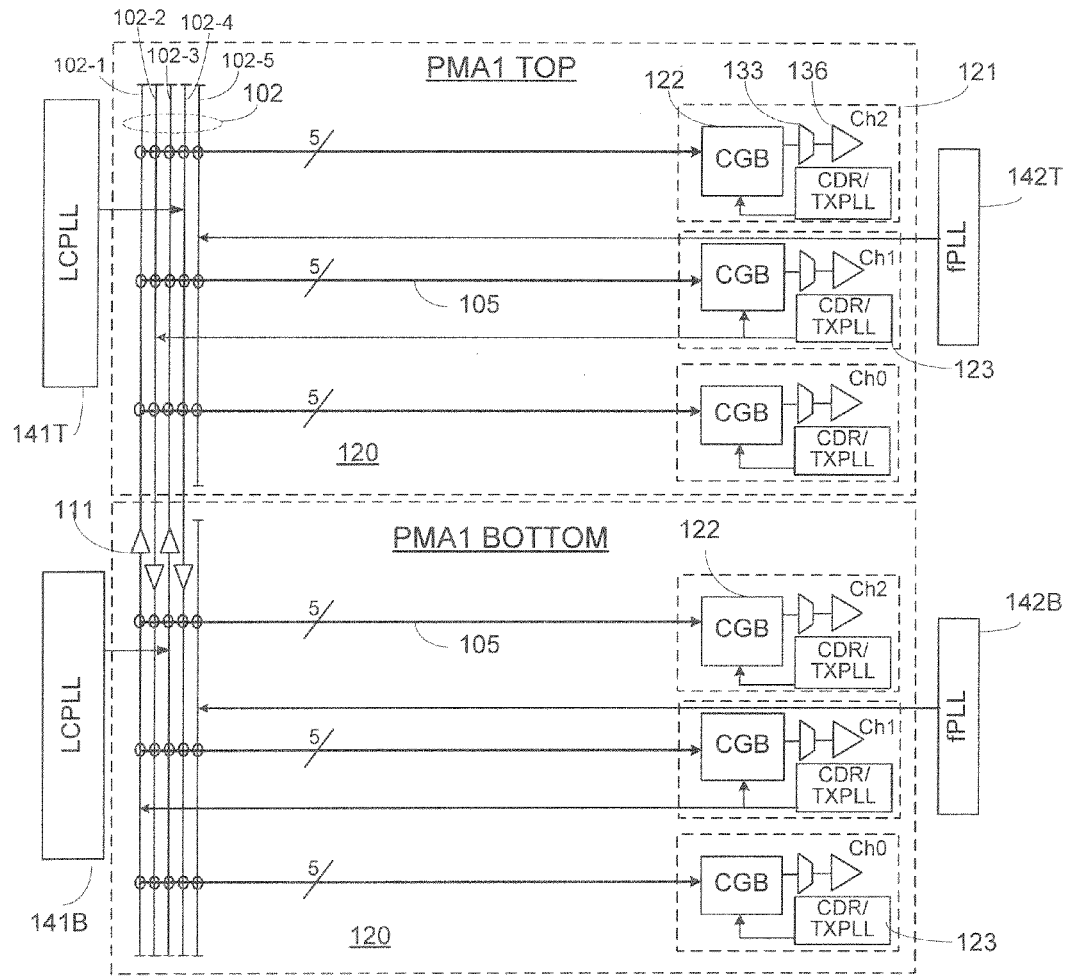
FIG. 1 illustrates a clock source routing portion of a clock network in physical media attachment ("PMA") circuitry in accordance with an embodiment of the present invention.

FIG. 1 illustrates a clock source routing portion of a clock network 1000 in physical media attachment ("PMA") circuitry, which is a specific type or portion of system interconnect circuitry, in accordance with an embodiment of the present invention. In some examples, PMA circuitry may include analog circuitry for I/O buffers, clock data recovery (CDR), serialize/deserialize (SERDES), and pre-emphasis and equalization to optimize serial data channel performance. In some examples, PMA circuitry is adapted to interface at high speed serial data rates of 622 megabits per second ("Mbs") to 13 gigabits per second ("Gbs"). The particular examples illustrated herein are in the context of a clock network for outgoing serializing circuitry, but those skilled in the art will appreciate that the underlying principles of illustrated embodiments of the invention can be applicable to other types of system interconnect circuitry.

Clock network 1000 is arranged in a plurality of PMA channel groups 120. The two PMA channel groups 120 illustrated in FIG. 1 are labeled PMA1_TOP and PMA1_BOTTOM. Each PMA channel group 120 includes three channels 121 ("channels" as used in this context are also sometimes referred to by those skilled in the art as "lanes") which are labeled "Ch0," "Ch1," and "Ch2" in each PMA channel group. Each channel 121 includes clock generation block circuitry ("CGB") 122, clock data recovery ("CDR")/transmit phase locked loop ("TxPLL") circuitry 123, clock output selection circuit (implemented as a multiplexer or "mux") 133, and clock output buffer 136. The terms "top" and "bottom" as used herein are simply labels used to distinguish between two PMA channel groups in a pair of PMA channel groups; those terms are not intended to have any more restrictive meaning as those skilled in the art will appreciate.

Each channel group 120 also includes an LC PLL and a fractional PLL ("fPLL"). PMA1_TOP includes LC PLL 141T and fPLL 142T. PMA1_BOTTOM includes LC PLL 141B and fPLL 142B. Both LC PLLs 141T and 141B are coupled to each CGB 122 in the two illustrated channel groups 120 (including PMA1_TOP and PMA1_BOTTOM). LC PLL 141T is coupled to CGBs 122 in channels 0, 1, and 2 of both PMA1_TOP and PMA1_BOTTOM via line 102-4 (in line group 102) and a respective line in respective line groups 105. Similarly, LC PLL 141B is coupled to CGBs 122 in channels 0, 1, and 2 of both PMA1_TOP and PMA1_BOTTOM via line 102-3 and a respective line in respective line groups 105. fPLL 142T is coupled to CGBs 122 in each channel of PMA1_TOP via line 102-5 and a line in line group 105. fPLL 142B is coupled to CGBs 122 in each channel of PMA1_BOTTOM via line 102-5 and a line in line group 105.

CDR/TxPLL block 123 in Ch1 of PMA1_TOP is coupled to CGBs 122 in channels 0, 1, and 2 of both PMA1_TOP and PMA1_BOTTOM via line 102-2 and a respective line in respective line groups 105. Similarly, CDR/TxPLL block 123 in Ch1 of PMA1_BOTTOM is coupled to CGBs 122 in channels 0, 1, and 2 of both PMA1_TOP and PMA1_BOTTOM via line 102-1 and a respective line in respective line groups 105. Block 123 includes circuitry to be utilized as a CDR for recovering a clock signal from a data signal or as a transmit PLL.

Note that individual lines in line groups 105 are not shown to avoid overcomplicating the drawings. Also, regarding individual lines in line group 102, lines 102-1, 102-2, 102-3, and 102-4 all are each in fact two lines joined by a buffer 111. Line 102-5 is really two separate lines that are not connected across the two illustrated channel groups (note that, in one embodiment, a given fPLL just provides signals to CGBs in the same channel group in which it is located). For simplifying the description and minimizing the amount of different reference numbers in the drawings and text, each of lines 102-1, 102-2, 102-3, and 102-4 are sometimes referenced herein referred to as "a" line even though each is made up of more than one line. This is true of certain other lines described in the context of other figures herein as will be appreciated by those skilled in the art.

In sum, the part of the network 1000 shown in FIG. 1 illustrates that a given CGB 122 can select from one of 6 sources for generating clock signals. For example, CGB 122 in channel 0 of PMA1_TOP is coupled to receive signals from one fPPL (fPLL 142T, the fPLL in the same PMA group 120 as the relevant CGB), two LC PLLs (including LC PLL 141T and LC PLL 141B), the CDR/TxPLL 123 in the same channel as the relevant CGB (i.e., CDR/TxPLL 123 in channel 0 of PMA1_TOP via a direct connection within the channel as shown), the CDR/TxPLL 123 in Ch1 of PMA1_TOP (via line 102-2 and a line in a group 105), and the CDR/TxPLL 123 in Ch1 of PMA1-BOTTOM (via line 102-1 and a line in a group 105). A given CGB 122 selects a signal from one of these sources and then uses it to generate eight differently phased clock signals as output which are used in PMA serializing operations.

Figure 2:
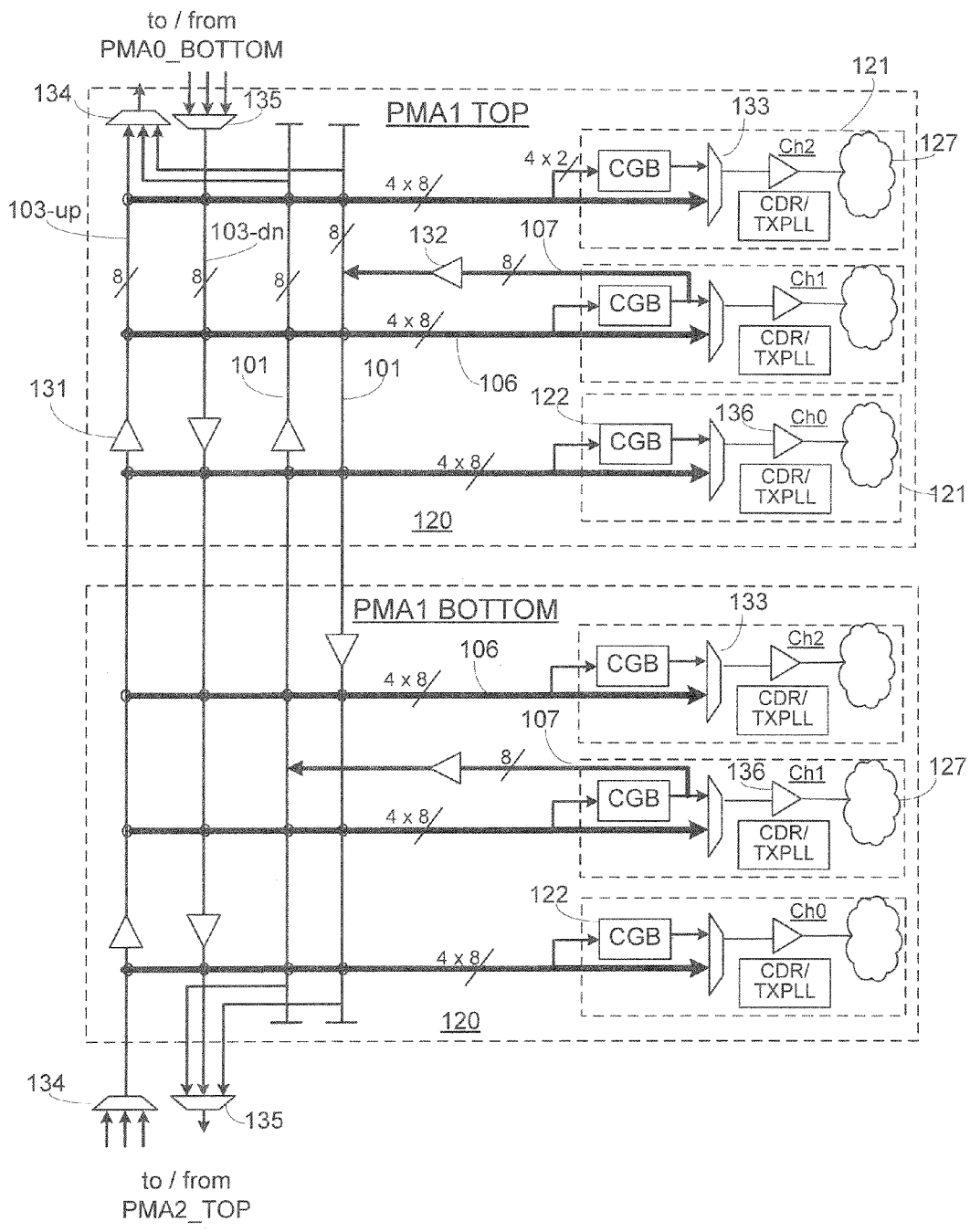
FIG. 2 illustrates a clock signal distribution portion of the clock network illustrated in FIG. 1.

FIG. 2 illustrate a clock signal distribution portion of clock network 1000 of FIG. 1. Clock signals for timing PMA operations are generated at the output of each CGB 122. Specifically, in this example, each CGB 122 outputs 8 differently phased clocks on a group of 8 lines (different phases for use in serializing operations) to a local channel output selection circuit 133. The selection circuit 133 is configurable to select between the 8-line output of the local CGB in the relevant channel and any one of the 4 groups of 8 lines in line group 106 and provide the selected 8 lines to channel PMA circuitry 127 (e.g., a serializer) through an output buffer 136 in the relevant channel.

The CGB in channel 1 of each PMA group is also coupled to provide its output on a line group 107 to a line group 101 as shown. From line groups 101, that output is provided to the CGB and selection circuit 133 in each of the 6 illustrated channels. Also, from lines 101, the output is provided to an input of a selection circuit 135, where it can be selected (depending on a configuration of control bits of selection circuit 135) to be provided to a "top" PMA channel group below PMA1_BOTTOM ("PMA2_TOP," not separately shown in FIG. 2) and to an input of a selection circuit 134, where it can be selected (depending on a configuration of control bits of selection circuit 134) to be provided to a "bottom" PMA channel group above PMA1_TOP ("PMA0_BOTTOM," not separately shown in FIG. 2).

The placement of vertical line buffers 131 and horizontal line buffers 132 is optimized in the illustrated example such that a given buffer drives signals over an approximate vertical distance of two channels. In one embodiment, this provides a beneficial tradeoff between buffer resources and maintaining signal quality.

The illustrated embodiment provides a PMA clock network that may be viewed as including two interconnected clock networks: A first network ("x6 network") provides clock distribution within a group of a set number (in this case 6) of PMA channels, including, for example, channels in the two illustrated channel groups 120 labeled PMA1_TOP and PMA1_BOTTOM. This network includes line groups 101, 107, and a portion of line groups 106. A second network ("xN network") provides clock distribution across an arbitrarily large number of other PMA channel groups that are arranged in a fashion similar to the illustrated groups PMA1_TOP and PMA1_BOTTOM. This network includes line groups 103-up, 103-down, selection circuits 134 and 135, as well as a portion of line groups 106. The ability of this arrangement to flexibly extend clock distribution is further illustrated in the context of FIG. 3.

Figure 3:
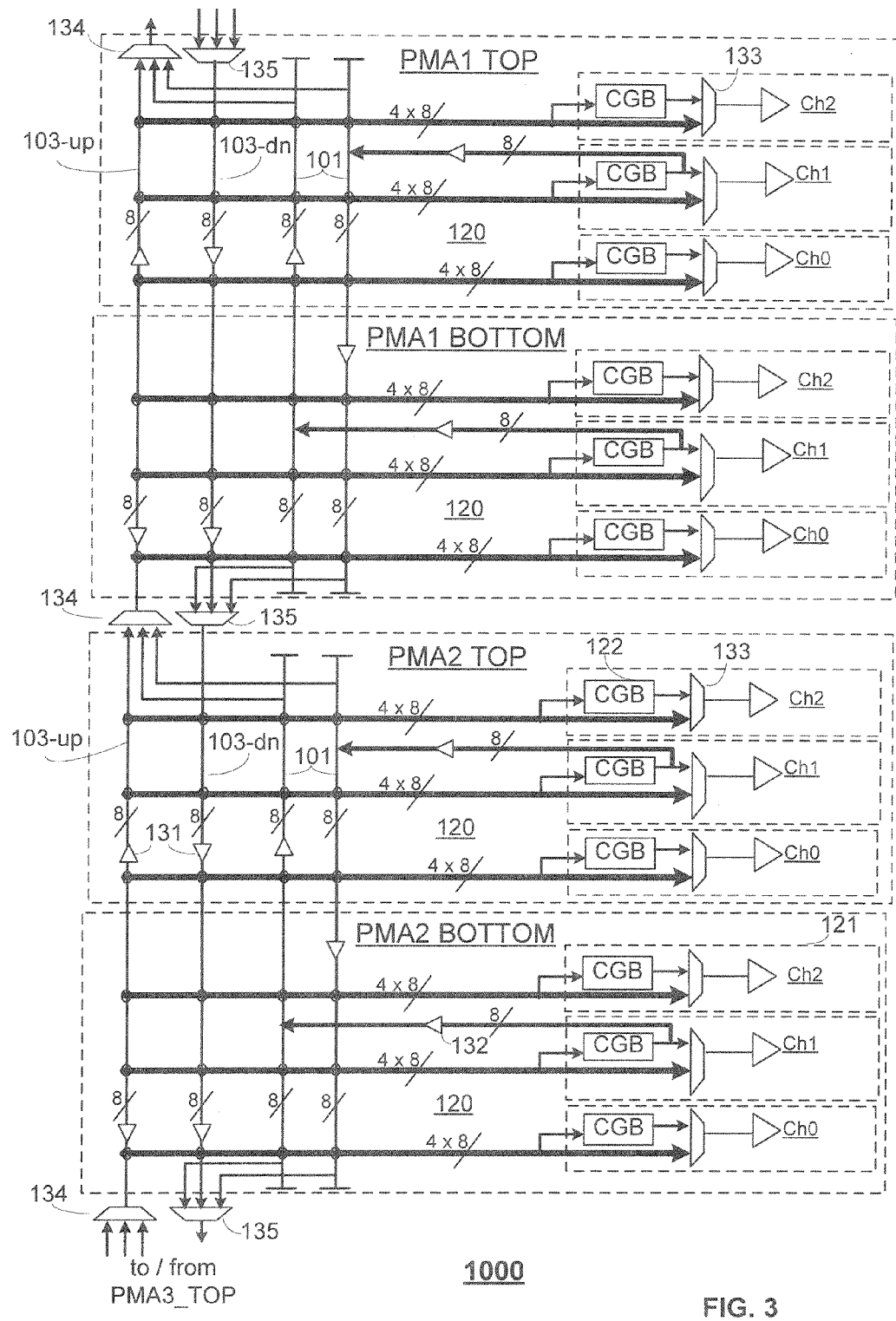
FIG. 3 is an expanded illustration of the clock distribution portion of the clock network in FIG. 2 shown across a larger number of PMA channel groups.

FIG. 3 illustrates network 1000 expanded across four channel groups and a total of twelve channels. Channel groups 120 illustrated include previously illustrated PMA1_TOP and PMA1_BOTTOM and a next lower pair of channel groups 120 labeled PMA2_TOP and PMA2_BOTTOM. The structure of PMA2_TOP and PMA2_BOTTOM follows that of PMA1_TOP and PMA1_BOTTOM and therefore will not be separately described again in detail. However, FIG. 3 does help further illustrate the relationship between pairs (i.e. a "top" group and a "bottom" group) of channel groups 120 and how clock network 1000 allows PMA clock distribution for flexible and scalable channel bonding.

As shown, a selection circuit 135 between the channel group pairs allows a line 103-dn in the PMA2 pair (i.e. "TOP" and "BOTTOM") to be driven by signals from either one of line groups 101 in the PMA 1 pair (which are respectively driven by signals from respective CGBs in channel 1 of PMA1_TOP and channel 1 of PMA1_BOTTOM), or by signals from line group 103-dn in the PMA1 pair which in turn would be receiving a signal selected by another selection circuit 135 coupled to receive signals from the PMA0_BOTTOM channel group 120 above the groups illustrated in FIG. 3 (PMA0_BOTTOM referenced in FIG. 2 but not separately illustrated in detail). As further shown, a selection circuit 134 coupled between the channel group pairs allows a line 103-up in the PMA1 pair to be driven by signals from either one of line groups 101 in the PMA2 pair (which are respectively driven by signals from respective CGBs in channel 1 of PMA2_TOP and channel 1 of PMA2_BOTTOM), or by signals from line group 103-up in the PMA2 pair which in turn would be receiving a signal selected by another selection circuit 134 coupled to receive signals from another channel group, PMA3_BOTTOM, arranged below the PMA2 pair (PMA3_BOTTOM not separately illustrated in FIG. 3).

The illustrated network allows the bonding of any two or more channels by allowing the same PMA clock signal to be distributed to those channels. At the same time, un-bonded channels can operate independently. Selections by respective selection circuits 133 in each channel allow selection between a clock signal generated by the local CGB in that channel, or, depending on selections made by various selection circuits 134 and 135, a clock signal generated by any channel 1 (central channel) CGB in other PMA channel groups.

PMA channels and associated clock distribution circuitry 1000 in FIG. 1 may be provided as part of input/out ("I/O") circuitry in any IC and configuration of selection circuitry to support flexible channel bonding can be accomplished in any IC that supports transceiver configuration. A specific example of an IC is a programmable logic device ("PLD"). PLDs (also referred to as complex PLDs, programmable array logic, programmable logic arrays, field PLAs, erasable PLDs, electrically erasable PLDs, logic cell arrays, field programmable gate arrays ("FPGAs"), or by other names) provide the advantages of fixed ICs with the flexibility of custom ICs. PLDs have configuration elements (i.e., programmable elements) that may be programmed or reprogrammed. Placing new data into the configuration elements programs or reprograms the PLD's logic functions and associated routing pathways. Such configuration may be accomplished via data stored in programmable elements on the IC. Programmable elements may include dynamic or static RAM, flip-flops, electronically erasable programmable read-only memory (EEPROM) cells, flash, fuse, anti-fuse programmable connections, or other memory elements. Configuration may also be accomplished via one or more externally generated signals received by the IC during operation of the IC. Data represented by such signals may or may not be stored on the IC during operation of the IC. Configuration may also be accomplished via mask programming during fabrication of the IC. While mask programming may have disadvantages relative to some of the field programmable options already listed, it may be useful in certain high volume applications.

Figure 4:
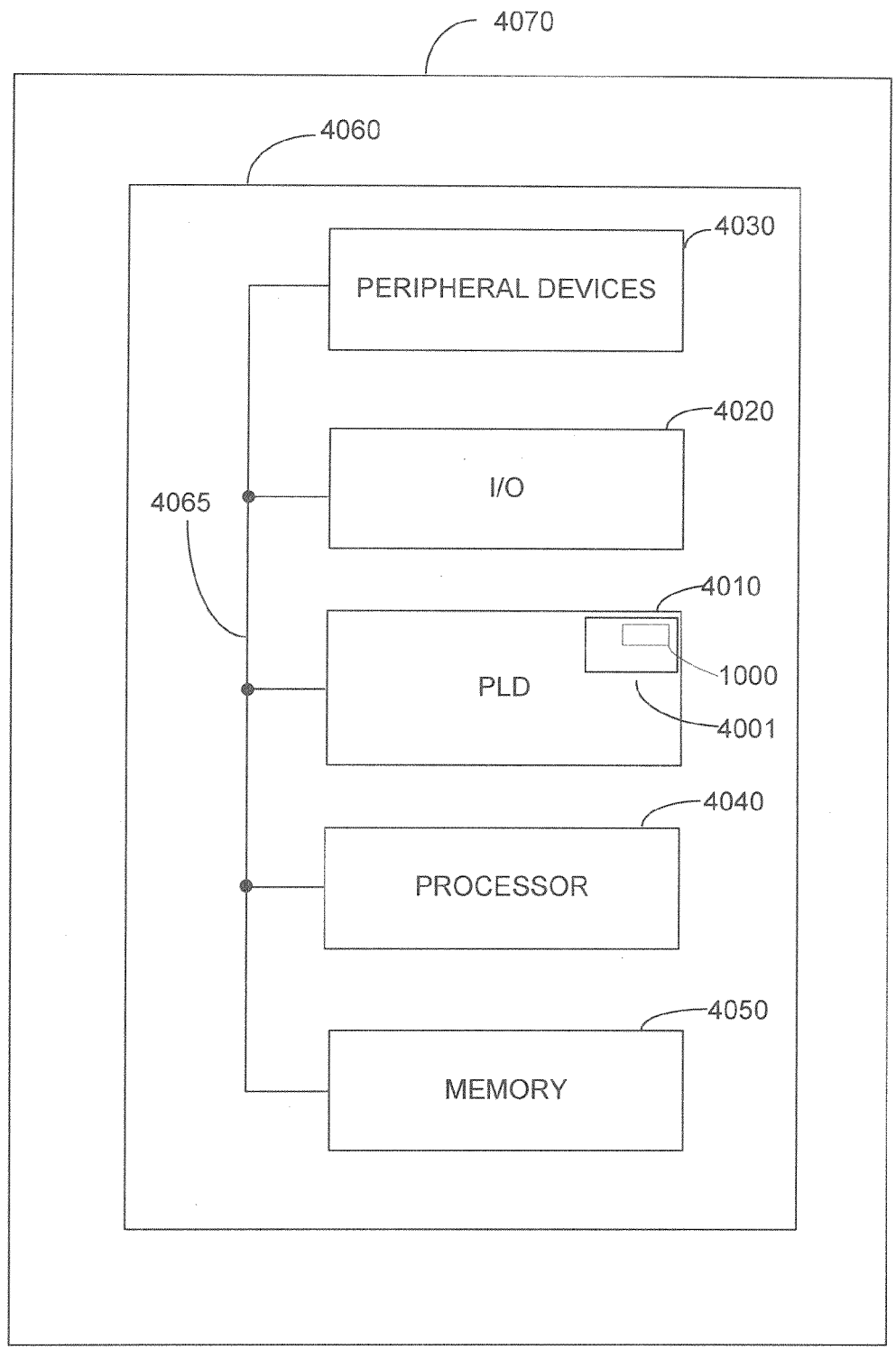
FIG. 4 illustrates an exemplary data processing system including a transceiver in a programmable logic device ("PLD"), the transceiver including circuitry in accordance with an embodiment of the present invention.

FIG. 4 illustrates an exemplary data processing system 4000 including a PLD 4010. PLD 4010 includes a transceiver 4001 with PMA circuitry 1000 including a clock network in accordance with an embodiment of the present invention. For ease of illustration, FIG. 4 illustrates only a single transceiver 4001; however, a PLD such as PLD 4010 may include multiple transceivers 4001.

Data processing system 4000 may include one or more of the following additional components: processor 4040, memory 4050, input/output (I/O) circuitry 4020, and peripheral devices 4030 and/or other components. These components are coupled together by system bus 4065 and are populated on circuit board 4060 which is contained in end-user system 4070. A data processing system such as system 4000 may include a single end-user system such as end-user system 4070 or may include a plurality of systems working together as a data processing system.

System 4000 can be used in a wide variety of applications, such as computer networking, data networking, instrumentation, video processing, digital signal processing, or any other application where the advantage of using programmable or reprogrammable logic in system design is desirable. PLD 4010 can be used to perform a variety of different logic functions. For example, PLD 4010 can be configured as a processor or controller that works in cooperation with processor 4040 (or, in alternative embodiments, a PLD might itself act as the sole system processor). PLD 4010 may also be used as an arbiter for arbitrating access to shared resources in system 4000. In yet another example, PLD 4010 can be configured as an interface between processor 4040 and one of the other components in system 4000. It should be noted that system 4000 is only exemplary.

While the present invention has been particularly described with respect to the illustrated embodiments, it will be appreciated that various alterations, modifications and adaptations may be made based on the present disclosure, and are intended to be within the scope of the present invention. While the invention has been described in connection with what are presently considered to be the most practical and preferred embodiments, it is to be understood that the present invention is not limited to the disclosed embodiments but only by the following claims.

What is claimed is:

1. System interconnect circuitry comprising:
   top groups of system interconnect channels, each channel including a clock generating circuit block ("CGB");
   bottom groups of system interconnect channels, each channel including a CGB, the top and bottom groups of system interconnect channels arranged in alternating fashion in the system interconnect circuitry such that a top group and bottom group are adjacent to each other;
   a network of connection lines and selection circuits arranged such that a designated CGB in a top group and a designated CGB in a bottom group are each coupled to selectively provide clock signal output to channel circuitry in any one or more of the channels included in the top and bottom groups of system interconnect channels.

2. The system interconnect circuitry of claim 1 further comprising a plurality of clock signal source circuits coupled to provide signals selectable by a CGB, the CGB being adaptable to use a selected signal from a clock signal source circuit to generate the clock signal output to the channel circuitry.

3. The system interconnect circuitry of claim 2 wherein the plurality of clock signal source circuits include phase locked loop circuits ("PLLs").

4. The system interconnect circuitry of claim 3 wherein the plurality of clock signal source circuits further include clock data recovery ("CDR") circuits.

5. The system interconnect circuitry of claim 3 wherein the PLLs include a fractional PLL.

6. The system interconnect circuitry of claim 5 wherein the PLLs further include an LC PLL.

7. The system interconnect circuitry of claim 4 wherein a CGB is coupled to receive selectable signals from a CDR circuit in a same channel as the CGB, a CDR circuit in a designated channel of a same channel group, and a CDR circuit in a designated channel of a different channel group in a same pair of channel groups.

8. The system interconnect circuitry of claim 6 wherein a CGB is coupled to receive selectable signals from two LC PLLs and one fractional PLL.

9. The system interconnect circuitry of claim 1 wherein each group of system interconnect channels comprises three system interconnect channels.

10. The system interconnect circuitry of claim 9 wherein respective designated CGBs in respective groups of system interconnect channels are each coupled in a central channel of the three system interconnect channels in a respective group of system interconnect channels.

11. The system interconnect circuitry of claim 1 further comprising a plurality of buffers coupled to drive connection lines in the network, the buffers being spaced apart such that a first buffer is a distance from a next in line buffer substantially equal to an approximate height of two channels.

12. The system interconnect circuitry of claim 1 wherein a selection circuit is coupled to channel circuitry in a particular channel in a particular channel group and is configurable to select between input from an output of a designated CGB in that particular channel or output of a designated CGB in a channel of a channel group other than that particular channel group.

13. The system interconnect circuitry of claim 1 wherein the system interconnect circuitry comprises physical media attachment circuitry.

14. The system interconnect circuitry of claim 1 wherein the system interconnect circuitry comprises analog circuitry.

15. The system interconnect circuitry of claim 1 wherein the system interconnect circuitry is operable at a data speed within a range of 622 megabits per second to 13 gigabits per second.

16. The system interconnect circuitry of claim 1 wherein the system interconnect circuitry includes circuitry adapted to transmit data to an outgoing serial data link.

17. A clock distribution network in system interconnect circuitry comprising:
   first line groups arranged to distribute system interconnect clock signals within a set number of channels of the system interconnect circuitry, the set number of channels being the number of channels in a first top and bottom pair of system interconnect channel groups;

second line groups coupled to each other and to the first line groups through first selection circuits, the second line groups being arranged to distribute system interconnect clock signals across a number of channels that is at least a multiple of the set number of channels; and second selection circuits coupled in each of a plurality of channels such that system interconnect circuitry in one of a plurality of channels receives, depending on configuration of the first and second selection circuits, output of a clock generating circuit block ("CGB") in the one of the plurality of channels or output of a CGB in a channel that is in a different channel group than the one of the plurality of channels.

18. The clock distribution network of claim 17 wherein the set number is 6.

19. The clock distribution network of claim 17 further comprising a plurality of buffers coupled to drive the first and second line groups, the buffers being spaced apart on a same signal pathway such that a first buffer is a distance from a next in line buffer substantially equal to an approximate height of two channels.

20. A method of arranging system interconnect circuitry for clock distribution, the method comprising:

arranging system interconnect channels in pairs of channel groups, each pair including a top and bottom channel group;

providing a plurality of clock source circuits coupled to a plurality of clock generating circuitry blocks ("CGBs") in each system interconnect channel group pair;

arranging connection lines and selection circuits to provide for selective coupling of the plurality of clock source circuits to the plurality of CGBs; and arranging connection lines and selection circuits to provide for selective coupling of at least one CGB in each channel group to channel circuitry in each of the system interconnect channels.

21. The method of claim 20 wherein, for each channel group pair, the plurality of clock source circuits includes first and second types of phase locked loop circuits ("PLLs").

22. The method of claim 20 wherein, for each channel group pair, the first type of PLL is coupled to CGBs in the channels of one channel group of the channel group pair and the second type of PLL is coupled to CGBs in the channels of both channel groups of the channel group pair.

23. The method of claim 22 wherein the first type of PLL is a fractional PLL ("fPLL") and the second type of PLL is an LC PLL.

24. The method of claim 20 wherein the plurality of clock source circuits includes clock data recovery ("CDR") circuits.

* * * * *